United States Patent [19]

Davis, Jr. et al.

[11] 4,361,792
[45] Nov. 30, 1982

[54] DIGITAL INDUCTION MOTOR CONTROL SYSTEM

[75] Inventors: Ray E. Davis, Jr., Old Lyme; Richard J. Becker, Madison; Robert G. Foster, Clinton; Michael J. Westkamper, Oakdale; Earle J. Timothy, Clinton; Richard H. Johnson, Ivoryton, all of Conn.

[73] Assignee: Chesebrough-Pond's Inc., Greenwich, Conn.

[21] Appl. No.: 147,102

[22] Filed: May 6, 1980

[51] Int. Cl.³ .............................................. H02P 5/40
[52] U.S. Cl. .................................... 318/729; 318/799; 318/798
[58] Field of Search ............... 318/799, 708, 209, 810, 318/729; 324/84 D; 323/322; 307/235 UA, 516; 235/92 PS

[56] References Cited

U.S. PATENT DOCUMENTS

| | | | |
|---|---|---|---|
| B 458,010 | 3/1976 | Sem-Sandberg | 324/83 D |
| 3,363,143 | 1/1968 | Cavanaugh | 323/238 |
| 3,505,507 | 4/1970 | Wright | 324/83 D |
| 3,663,956 | 5/1972 | Purdy et al. | 324/83 D |
| 3,683,345 | 8/1972 | Faulkes et al. | 324/83 D |
| 3,691,452 | 9/1972 | Aguiar | 323/322 |
| 3,950,657 | 4/1976 | Sheng et al. | 307/235 UA |
| 4,052,648 | 10/1977 | Nola | 318/810 |
| 4,055,795 | 10/1977 | Mathieu | 318/729 |
| 4,063,146 | 12/1977 | Oliver | 318/332 |
| 4,174,496 | 11/1979 | McFall et al. | 361/97 |
| 4,194,145 | 5/1980 | Ritter | 318/799 |

OTHER PUBLICATIONS

Jackson et al., "Direct Digital Control of Thyristor Convertors", *IFAC Symposium on Control and Power Electronics & Electrical Devices*, Oct. 1974, vol. I, pp. 431–441.

*Primary Examiner*—David Smith, Jr.

[57] ABSTRACT

A digital self-calibrating power factor controller for an AC induction motor. During start-up a first number corresponding to the actual phase angle between motor voltage and current is determined and compared with a second number corresponding to a desired delay in energizing the motor. The second number is varied until both numbers are approximately equal. A third number corresponding to a desired phase angle is determined and stored and the system switches from start-up to run. The first number corresponding to the actual phase angle is now compared with the third number corresponding to the desired phase angle. The second number corresponding to a desired delay is now varied with motor load so as to keep the actual phase angle equal to the desired phase angle.

33 Claims, 2 Drawing Figures

DIGITAL INDUCTION MOTOR CONTROL SYSTEM

BACKGROUND OF THE INVENTION

The present invention relates to a power factor control system for AC induction motors and, more particularly, to a self-calibrating power factor controller for AC induction motors.

A power factor control system for AC induction motors is disclosed in U.S. Pat. No. 4,052,648 issued to Frank J. Nola on Oct. 4, 1977 and assigned to the United States of America as represented by the Administrator of the National Aeronautics and Space Administration ("NASA"). The Nola patent is contained in a NASA Technical Support Package dated March, 1979 and entitled "Power Factor Controller, Brief No. MFS-23280". In addition to the Nola patent, the Technical Support package contains schematic diagrams of variations and improvements on the circuitry disclosed in the Nola patent.

As explained in the Nola patent and in the NASA Technical Support Package, the current in an AC induction motor may lag the voltage by a phase angle of 80° when the motor is unloaded and by 30° when the motor is loaded. This phase angle "$\theta$" is used to compute the power factor for the motor, which is defined as $\cos \theta$. Thus, when $\theta$ is small the power factor approaches 1. Conversely, where $\theta$ is large the power factor approaches zero. Fundamentally, a low power factor means that energy is being wasted. Given the tremendous numbers of AC induction motors in use today, improving the power factor could result in very substantial energy savings. Estimates of potential energy savings are set forth at pages 3 and 10 of the NASA Technical Support Package.

The operation of the Nola power factor controller is described in the NASA Technical Support Package at pages 11 and 15 using the functional block diagram appearing at page 13. The line voltage is sensed and signals corresponding to the line voltage and its complement are produced. The motor current is also sensed and signals corresponding to the motor current and its complement are also produced. An "EXCLUSIVE OR" logic operation is then performed on these voltage and current signals, the result of which is one input to a summing amplifier and low pass filter. The other input is a DC signal, derived from a potentiometer, which corresponds to a commanded phase angle and, therefore, a commanded power factor. The result of this filtering and summing operation is a DC system error voltage which is then compared with a ram voltage synchronized with the zero crossings of the line voltage. The intersection of the ramp voltage with the DC error voltage is detected by the comparator and used to trigger the triac. As the load on the motor decreases, the phase angle tends to increase. In response the controller decreases the triac duty cycle which reduces the voltage applied to the motor and maintains the commanded phase angle. Conversely, as the motor load increases, the phase angle tends to decrease. In response the controller increases the triac duty cycle which increases the voltage applied to the motor and maintains the commanded phase angle.

Because of the analog nature of the Nola circuitry, that system is susceptible to changes during operation, due for example to variations in temperature. In addition, the Nola system requires a separate manual determination and setting of the power factor command potentiometer for each motor.

BRIEF DESCRIPTION OF THE PRESENT INVENTION

The present invention overcomes the disadvantages of the Nola power factor controller and represents a significant improvement. In the present invention a digital solution to the problem has been found which requires no adjustment. The power factor controller of the present invention is self-calibrating, which means that it is no longer necessary to make a separate manual determination and setting of the power factor command potentiometer for each motor. Indeed, in accordance with the present invention the power factor controller is automatically re-calibrated each time the motor is turned on, irrespective of the load on the motor.

In one embodiment, the present invention employes a clock, a series of counters and a register. A phase angle counter is used to determine the phase angle between the voltage and current by counting clock pulses between the zero crossings of motor voltage and current. A delay counter is used to delay the firing of the triac by counting a predetermined number of clock pulses, starting when the current crosses zero. During start-up the delay counter is initially loaded with a count of zero. The count loaded into the delay counter is then periodically incremented until the count in the delay counter equals the count in the phase angle counter. At that point the count in the phase angle counter is stored in the register. This stored count corresponds to the desired phase angle and, therefore, to the commanded power factor. The controller now switches from start-up to run. During the run mode the count in the phase angle counter is compared with the count stored in the register and any difference is used to periodically increment or decrement the count loaded into the delay counter and, therefore, to advance or delay the firing of the triac so as to maintain the actual phase angle equal to the desired phase angle.

DETAILED DESCRIPTION

Figure 1:
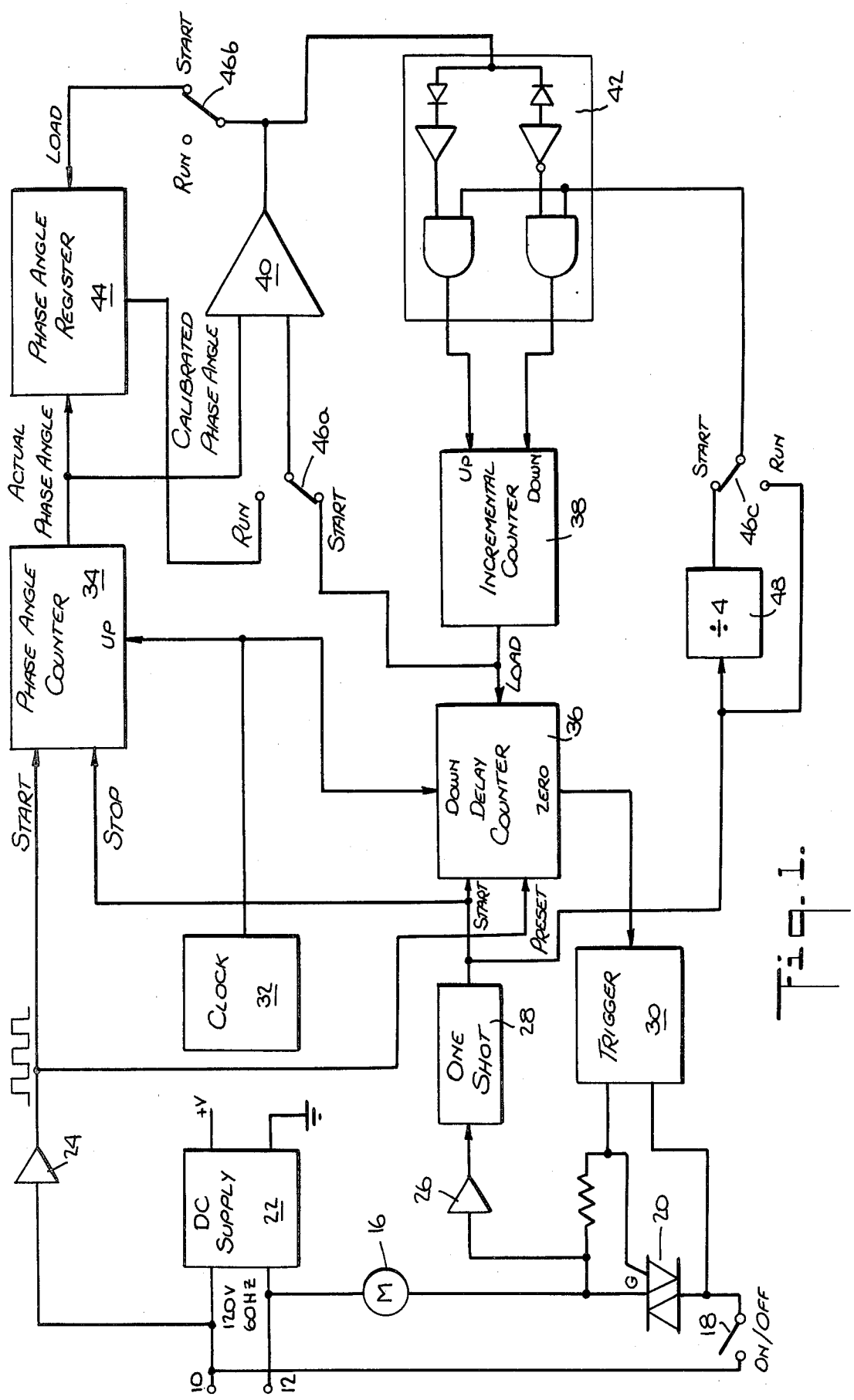
FIG. 1 is a functional block diagram of one illustrative embodiment of the present invention.

The present invention will now be described with reference to the figures which form a part of the specification. FIG. 1 is a functional block diagram of one illustrative embodiment of the invention which will be employed to explain the principles of operation thereof. As shown in FIG. 1, the power factor controller is adapted for connection to a source of AC power at terminals 10 and 12. Terminal 12, which is preferably connected to the neutral wire, is connected to one lead of motor 16 while terminal 10 is connected to the other lead of motor 16 through switch 18 and triac 20. Switch 18 may, for example, be a treadle-operated ON/OFF switch on an industrial sewing machine. Connected across the AC source is DC power supply 22 which provides regulated DC voltage.

Connected to terminal 10 is amplifier 24 which produces a square wave having zero crossings corresponding to those of the line voltage. Connected to a point between motor 16 and triac 20 is amplifier 26 which produces pulses corresponding to the zero crossings of the motor current. The output of amplifier 26 is connected to the input of one shot multivibrator 28 which produces a pulse each time the motor current crosses zero. Trigger circuit 30 is connected across triac 20 and controls the firing thereof.

Clock 32 produces a train of pulses, preferably at a frequency which is not a multiple of the line frequency, which are fed to phase angle counter 34 and delay counter 36. Phase angle counter 34 is connected both to amplifier 24 and to one shot 28. Counter 34 starts counting up clock pulses each time the line voltage crosses zero and stops counting each time the motor current crosses zero. The resulting count in counter 34 thus corresponds to the phase angle between the motor voltage and current. Delay counter 36 is also connected to amplifier 24 and one shot 28, as well as to incremental counter 38. Delay counter 36 is loaded with the count contained in incremental counter 38 each time the line voltage crosses zero. Counter 36 starts counting down from this count each time the motor current crosses zero. When counter 36 reaches zero, an output is produced which causes trigger 30 to fire triac 20.

The output of incremental counter 38 is also connected to one input of comparator 40 via switch 46a. The second input to comparator 40 is the output from phase angle counter 34. Comparator 40 determines whether the count in incremental counter 38 (and therefore the count loaded into delay counter 36) is less than, equal to or greater than that in phase angle counter 34. The output of comparator 40 is connected directly to steering gate 42 and to phase angle register 44 via switch 46b. Steering gate 42 determines whether incremental counter 38 is incremented or decremented. Connected between steering gate 42 and one shot 28 is switch 46c and divide-by-four circuit 48, which may comprise a pair of serially-connected flip-flops. During start-up counter 38 is incremented every other cycle and during run every half cycle.

During start-up the motor is allowed to run for several seconds to get up speed. At this point the count in incremental counter 38 is zero. Comparator 40 therefore causes counter 38 to be incremented every other cycle. This continues until the count in counter 38 equals the count in counter 34. When comparator 40 determines that the count in counter 34 equals the count in counter 38, several things occur. The count in phase angle counter 34 is loaded into phase angle register 44; one input of comparator 40 is disconnected from the output of incremental counter 38 and connected instead to the output of phase angle register 44; the output from comparator 40 is removed from register 44; and gate 42 is connected directly to the output of one shot 28. The power factor controller has now switched from start-up to run. Henceforth, comparator 40 will compare the count in phase angle counter 34 with that stored in phase angle register 44 and, depending on the results of that comparison, increment or decrement incremental counter 38 every half cycle, thereby either increasing or decreasing the delay in firing triac 20.

It will be appreciated by those skilled in the art that the illustrative embodiment of FIG. 1 may be implemented using discrete components and/or integrated circuit chips. Similarly, the illustrative embodiment of FIG. 1 may be implemented using hard-wired circuits or by means of a programmed digital computer. Also, numerous other systems may be constructed which may differ in form from the illustrative embodiment of FIG. 1 but which nevertheless embody the principles of the present invention. For example, if a programmed digital computer were employed to implement the present invention then the functions performed by counters 34, 36 and 38, register 44, comparator 40, gate 42, divider 48 and switches 46a, 46b and 46c might all be performed by that computer. In that event, the comparison of the output from counter 38 or register 44 with that of counter 34 could be effected by means of a subtraction operation in the arithmetic logic unit in the computer. If, on the other hand, the illustrative embodiment of FIG. 1 were implemented using hard-wired circuits, then counters 34, 36 and 38 and register 44 might comprise integrated circuit chips and switches 46a, 46b and 46c might comprise reed relays or solid state switches. Comparator 40 might comprise a pair of A/D converters and a pair or oppositely biased operational amplifiers and gate 42 and divider 48 might comprise either discrete components and/or integrated circuit chips.

Figure 2:
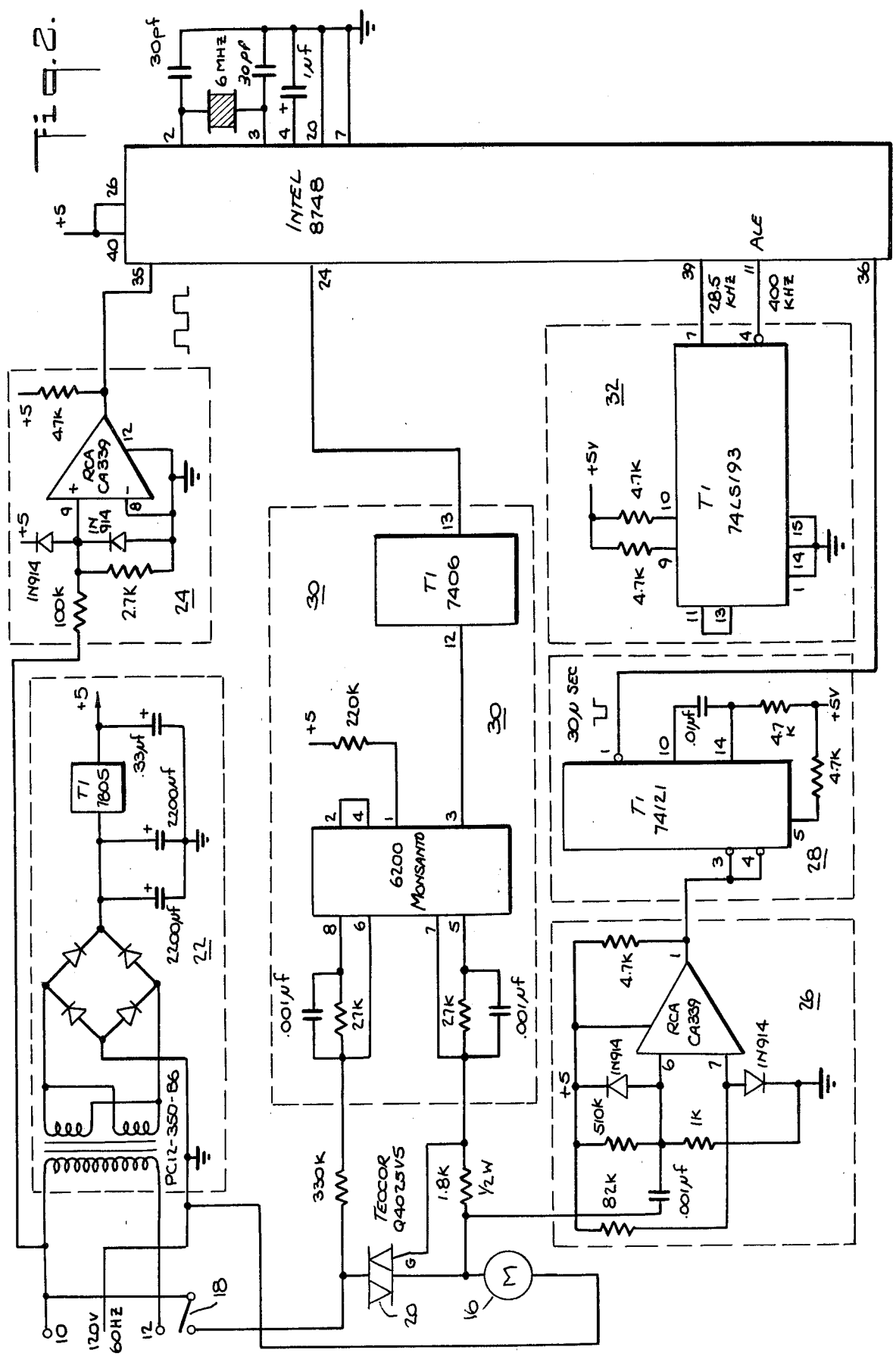
FIG. 2 is a schematic diagram of one implementation of the illustrative embodiment shown in FIG. 1.

A preferred method for implementing the illustrative embodiment of FIG. 1 is shown in FIG. 2. In FIG. 2 DC supply 22 comprises a full-wave bridge rectifier and a Texas Instrument ("TI") 7805 regulator integrated circuit chip. Amplifiers 24 and 26 comprise RCA CA 339 operational amplifiers. One shot multivibrator 28 comprises a TI 74121 integrated circuit chip. Clock 32 comprises a TI 74LS193 counter which is used to divide the 400 KHz address latch enable ("ALE") signal down to 28.5 KHz. Trigger 30 comprises a TI 7406 integrated circuit buffer amplifier and a Monsanto 6200 chip comprising a pair of optically coupled SCRs connected as a triac.

In FIG. 2 the functions performed by phase angle counter 34, delay counter 36, incremental counter 38, phase angle register 44, comparator 40, gate 42, divider 48 and switches 46a, 46b and 46c are handled by an Intel 8748 programmable digital microcomputer. A suitable program for the computer is included at the end of the instant specification. In the computer counters are used to perform the functions of phase angle counter 34 and delay counter 36 and registers are used to perform the functions of phase angle register 44 and incremental counter 38. The function of comparator 40 is accomplished by means of a subtraction operation in the arithmetic logic unit. The functions of gate 42, divider 48 and switches 46a, 46b and 46c are performed by logic elements under software control.

When a computer is used to implement the functional block diagram of FIG. 1 the run mode can be handled slightly differently. Instead of incrementing or decrementing the delay counter by one count every half cycle to maintain the number in the phase angle counter equal to the number in the phase angle register, the delay counter can be altered by that number of counts equal to the difference between the number of counts in the phase angle counter and the number of counts in the phase angle register. In this manner less time is required to bring the phase angle counter into agreement with the phase angle register. This is particularly advantageous in handling clutched loads. The delay counter can also be altered by that number of counts equal to half the difference between the number of counts in the phase angle counter and the number of counts in the phase angle register.

If the power factor is calibrated as aforesaid and with the motor unloaded, then power savings of on the order of 50% can be obtained when the motor is operated unloaded. If, however, the power factor is calibrated with the motor loaded, then power savings of on the order of 65% are obtained when the motor is operated unloaded. To maximize power savings irrespective of whether the power factor is calibrated with the motor loaded or unloaded, a further refinement of the calibration procedure may be employed which will now be explained.

The phase angle initially measured when the motor has first been turned on and has gotten up speed is defined as $\theta_1$. Because $\theta_1$ can vary slightly from cycle to cycle, an average value for $\theta_1$ is preferably obtained. The phase angle which exists when the count in the phase angle counter equals the count in the delay counter is defined as $\theta_2$. The following ratio can then be computed.

$$\frac{\theta_1 - \theta_2}{\theta_1} = N_1.$$

Based on limited experimentation it has been observed that when $\theta_2$ is determined with the motor unloaded $N_1$ is about 0.38. It has also been observed that when $\theta_2$ is determined with the motor loaded, $N_1$ is about 0.46. When $\theta_2$ is determined with the motor unloaded, power savings of about 50% are obtained with the motor unloaded. When $\theta_2$ is determined with the motor loaded, power savings of about 65% are obtained with the motor unloaded. The following calculations can now be made to adjust $\theta_2$ so as to maximize power savings irrespective of whether calibration occurs with the motor loaded, unloaded or partially loaded. $N_1$ is first divided by 0.46 to form $N_2$ and $\theta_2$ is multiplied by $N_2$ to form $\theta_3$, which is the calibrated phase angle which is best calculated to maximize power savings. Accordingly, $\theta_3$ is preferably stored in the phase angle register. Of course, if for some reason it is not desired to maximize power savings, using $\theta_2$ as the calibrated phase angle will still result in very substantial savings. When $\theta_3$ is used power savings of on the order of 65% are obtained with the motor unloaded and power savings of up to 25% are obtained with the motor loaded.

It will be appreciated by those skilled in the art that, for different types of AC induction motors, it may be desirable to employ a constant having a value other than 0.46 in order to maximize power savings. It will also be appreciated by those skilled in the art that while the number corresponding to the actual phase angle is preferably produced by starting and stopping a counter following voltage and current zero crossings, a free-running counter could just as easily be employed. In the latter event the number corresponding to the actual phase angle is the difference between the number in the counter at the times of voltage and current zero crossings. In both cases, however, clock pulses are counted to produce a number corresponding to the actual phase angle. Similarly, while the delay counter is shown as counting down to zero it could count up or down from one number to another number, the difference between the numbers being the important thing. These are but several examples of how the form of the present invention could be changed without departing from the principles hereof.

Although shown applied to a single phase AC induction motor, the present invention may be applied to poly-phase AC induction motors as well. Indeed, controlling the power factor of a three phase AC induction motor requires little additional circuitry: two more triacs (or SCRs) and associated triggering circuitry for the two additional phases and, for example, a counter and a shift register for generating fixed delays for energizing the other two phases. Since the relationship among the phases is fixed, controlling the power factor of a three phase AC induction motor only involves determining the calibrated phase angle for one phase and using that same phase angle for the other two phases.

```
ISIS-II MCS-48/UPI-41 MACRO ASSEMBLER, V3.0
MCS 48 DIGITAL MOTOR CONTROLLER, V.M=9.0

LOC  OBJ          LINE          SOURCE STATEMENT

1  $TITLE('MCS 48 DIGITAL MOTOR CONTROLLER, V.M=9.0')
                       2  $INCLUDE(:F1:CPISTD.S01)
                  =    3  $EJECT
                  =    4  ;
                  =    5  ;       ***************************************************
                  =    6  ;       (C) 1979, 1980, CHESEBROUGH-POND'S INC
                  =    7  ;
                  =    8  ;       ALL RIGHTS RESERVED.  NO PART OF THIS PROGRAM MAY
                  =    9  ;       BE REPRODUCED, TRANSMITTED, TRANSCRIBED,
                  =   10  ;       STORED IN A RETRIEVAL SYSTEM, OR TRANSLATED INTO
                  =   11  ;       ANY LANGUAGE OR COMPUTER LANGUAGE, IN ANY FORM OR
                  =   12  ;       BY ANY MEANS, ELECTRONIC, MECHANICAL, MAGNETIC,
                  =   13  ;       OPTICAL, CHEMICAL, MANUAL OR OTHERWISE, WITHOUT
                  =   14  ;       THE EXPRESS WRITTEN PERMISSION OF CHESEBROUGH-POND'S
                  =   15  ;       INC., 33 BENEDICT PLACE, GREENWICH, CONNECTICUT.
                  =   16  ;
                  =   17  ;       ***************************************************
                  =   18  $EJECT
                      19  ;
                      20  ;               THIS VERSION COMPLETELY CONTROLS AN A/C INDUCTION MOTOR
                      21  ;               VIA AN AUTOMATIC CALIBRATION PROCESS.
                      22  ;               THAT PROCESS IS DEFINED IN OTHER DOCUMENTS.
                      23  ;               THIS VERSION IS SENSITIVE TO THE SPECIFIC HARDWARE
                      24  ;               DESIGN FOR 'HOT-SIDE' TRIAC FIRING.
                      25  ;
                      26  $EJECT
                      27  ;       MCS-48 PORT AND BUS CODING
                      28  ;               PORT 2
```

ISIS-II MCS-48/UPI-41 MACRO ASSEMBLER, V3.0
MCS 48 DIGITAL MOTOR CONTROLLER, V.M=9.0

LOC  OBJ        LINE           SOURCE STATEMENT

```
                29 ;                           BIT 7 UNUSED
                30 ;                           BIT 6 UNUSED
                31 ;                           BIT 4 VOLTAGE WAVE FORM SQUARED
                32 ;                           BIT 5 CURRENT WAVE FORM SQUARED
                33 ;                           BIT 3 TRIAC FIRING
                34 ;                           BIT 2 30% SAVED NOT
                35 ;                           BIT 1 20% SAVED NOT
                36 ;                           BIT 0 10% SAVED NOT
                37 ;
                38 ;              PORT 1
                39 ;                           BIT 7 UNUSED
                40 ;                           BIT 6 THRU
                41 ;                           BIT 0 UNUSED
                42 ;
                43 ;              BUS PORT
                44 ;                           BIT 7 THRU
                45 ;                           BIT 0 UNUSED
                46 ;              INT    UNUSED
                47 $EJECT
                48 ;
                49 ;        MACROS
                50 $INCLUDE(:F1:DIV848.SO1)
             =  51 DIVID  MACRO
             =  52        LOCAL   DIV,DV0,DV1,DV2,DV3,DV4,DV5
             =  53 ;      DIVIDEND     =R2,R3
             =  54 ;      DIVISOR      =A
             =  55 ;      QUOTIENT     =R3,R4
             =  56 ;      REMAINDER    =R2
             =  57
             =  58 DIV:   MOV     R5,#9           ;INIT COUNTER
             =  59        MOV     R0,A            ;R0=DIVISOR
             =  60 DV0:   CLR     C               ;DIVISOR NORMALIZ
             =  61        JB7     DV1             ;IF BIT7 = 0
             =  62        CPL     A               ;OR
             =  63        ADD     A,R2            ;IF R2 > DIVISOR
             =  64        JNC     DV1
             =  65        CPL     A
             =  66        INC     R5
             =  67        MOV     A,R0
             =  68        RL      A
             =  69        MOV     R0,A
             =  70        JMP     DV0
             =  71 DV1:   MOV     R4,#0
             =  72        MOV     A,R2
             =  73 DV2:   CPL     A
             =  74        JC      DV3
             =  75        ADD     A,R0
             =  76        JC      DV5
             =  77        JMP     DV4
             =  78 DV3:   ADD     A,R0
             =  79        CLR     C
             =  80 DV4:   CPL     A
             =  81        MOV     R2,A
             =  82 DV5:   CPL     C
             =  83        MOV     A,R4
             =  84        RLC     A
             =  85        MOV     R4,A
             =  86        MOV     A,R3
             =  87        RLC     A
             =  88        MOV     R3,A
             =  89        MOV     A,R2
             =  90        RLC     A
             =  91        MOV     R2,A
             =  92        DJNZ    R5,DV2
             =  93        RRC     A
             =  94        MOV     R2,A
             =  95        ENDM
                96 $INCLUDE(:F1:MUL848.SO1)
             =  97 MULT   MACRO
             =  98        LOCAL   MUL1,MUL2,MUL3
             =  99 ;
             = 100 ;      MULTIPLIER   =R1
             = 101 ;      MULTLIPLICAND =R2
             = 102 ;      LOOPER       =R3
             = 103 MUL1:  MOV     R3,#08H         ;COUNTER TO 0
             = 104        CLR     A
             = 105        CLR     C
             = 106 MUL2:  RRC     A
             = 107        XCH     A,R1
             = 108        RRC     A
             = 109        XCH     A,R1
             = 110        JNC     MUL3
             = 111        ADD     A,R2
             = 112 MUL3:  DJNZ    R3,MUL2
             = 113        RRC     A
             = 114        XCH     A,R1
```

ISIS-II MCS-48/UPI-41 MACRO ASSEMBLER, V3.0
MCS 48 DIGITAL MOTOR CONTROLLER, V.M=9.0

```
LOC  OBJ         LINE        SOURCE STATEMENT

= 115       RRC    A
                 = 116       XCH    A,R1
                 = 117       ENDM
                   118 ;
                   119 ;     EDGE   PARM1                  ;FIND EDGE OF VOLTAGE SIGNAL
                   120 ;            PARM1                  ;DEBOUNCE COUNT
                   121 ;
                   122 EDGE  MACRO  PARM1
                   123       LOCAL  EDGE1,EDGE2
                   124       SEL    RB1
                   125       IN     A,P2                   ;GET INITIAL CONDITION
                   126       MOV    R3,A                   ;SAVE IT
                   127 EDGE1:
                   128       MOV    R2,#PARM1
                   129 EDGE2:
                   130       IN     A,P2                   ;READ VOLTAGE
                   131       XRL    A,R3                   ;XRL WITH ORIGINAL CONDITION
                   132       CPL    A                      ;INVERT RESULT
                   133       JB4    EDGE1                  ;SAME
                   134       DJNZ   R2,EDGE2               ;DEBOUNCE IT
                   135       SEL    RB0
                   136       ENDM
                   137 $EJECT
                   138 ;
                   139 ;     PROGRAM EQUATES
                   140 ;
0023               141 QFACT EQU    35                     ;Q FACTOR FOR ADJUSTING FINAL DELAY
00FF               142 IP2   EQU    0FFH                   ;INITIAL PORT 2 STATE
0001               143 FLOP  EQU    1H                     ;FLIP FLOP CLOCK
00F7               144 TROFF EQU    0F7H                   ;TRIAC OFF
0008               145 TRON  EQU    08H                    ;TRIAC ON
0007               146 SVOFF EQU    07H                    ;TURN OFF SAVE LIGHTS
00FE               147 SV10  EQU    0FEH                   ;SAVE 10%
00FD               148 SV20  EQU    0FDH                   ;SAVE 20%
00FB               149 SV30  EQU    0FBH                   ;SAVE 30%
0030               150 P2IN  EQU    30H                    ;I/C PORT 2
00B9               151 MAXWT EQU    185                    ;MAX WAIT COUNT FOR CURRENT ZERO CROSS
0005               152 FIVE  EQU    5                      ;5
0000               153 ZERO  EQU    0                      ;0
0000               154 MTRON EQU    0                      ;MOTOR CONDITION FLAG, MOTOR ON
0001               155 MTROFF EQU   1                      ;  "        "      "    MOTOR OFF
                   156 ;
                   157 ;     REGISTERS EQUATES
                   158 ;
                   159 ;RB0
                   160 ;     R0-RUN/STOP FLAG (BIT 0)
                   161 ;     R1-LOOP CONTROL FOR 4MS WAIT
                   162 ;     R2-FLIP-FLOP
                   163 ;     R3-PHASE ANGLE COUNT
                   164 ;     R4-DELAY COUNT SAVE
                   165 ;     R5-DELAY COUNTER
                   166 ;     R6-SAVE PHASE ANGLE COUNT
                   167 ;     R7-DELAY SAVE, OPT PHASE ANGLE
                   168 ;RB1
                   169 ;     R0-INITIAL PHASE ANGLE AFTER STARTUP
                   170 ;     R1-
                   171 ;     R2-EDGE MACRO
                   172 ;     R3-EDGE MACRO
                   173 ;     R4-
                   174 ;     R5-
                   175 ;     R6-
                   176 ;     R7-
                   177 $EJECT
                   178 ;
                   179 ;     PROGRAM START UP AND INTERRUPT VECTORS
                   180 ;
0000               181       ORG    0H
0000 0409          182       JMP    INIT                   ;START UP VECTOR
0009               183       ORG    09H
                   184 ;
                   185 INIT:
0009 C5            186       SEL    RB0                    ;SELECT REGISTER BANK 0
000A 23FF          187       MOV    A,#IP2                 ;TURN ON TRIAC
000C 3A            188       OUTL   P2,A                   ;AND SET UP INPUTS ON PORT 2
000D 85            189       CLR    F0
000E 95            190       CPL    F0                     ;INITIALLY SET IN RUN MODE
000F 27            191       CLR    A                      ;CLEAR REGISTERS AND COUNTERS
0010 BA05          192       MOV    R2,#FIVE
0012 BB00          193       MOV    R3,#ZERO
0014 B800          194       MOV    R0,#MTRON              ;ASSUME MOTOR IS ON
0016 AC            195       MOV    R4,A
0017 AD            196       MOV    R5,A
0018 AE            197       MOV    R6,A
0019 AF            198       MOV    R7,A
001A D5            199       SEL    RB1                    ;ZERO INITIAL PHASE ANGLE SAVE
```

ISIS-II MCS-48/UPI-41 MACRO ASSEMBLER, V3.0
MCS 48 DIGITAL MOTOR CONTROLLER, V. M=9.0

| LOC  | OBJ  | LINE      |       | SOURCE STATEMENT |              |
|------|------|-----------|-------|------------------|--------------|
| 001B | A8   | 200       |       | MOV              | R0,A         | ;YEP
| 001C | A9   | 201       |       | MOV              | R1,A         |
| 001D | AA   | 202       |       | MOV              | R2,A         |
| 001E | AB   | 203       |       | MOV              | R3,A         |
| 001F | AC   | 204       |       | MOV              | R4,A         |
| 0020 | AD   | 205       |       | MOV              | R5,A         |
| 0021 | AE   | 206       |       | MOV              | R6,A         |
| 0022 | AF   | 207       |       | MOV              | R7,A         |
| 0023 | C5   | 208       |       | SEL              | RB0          |
|      |      | 209       | WAIT: |                  |              | ;INITIAL WAIT PERIOD
| 0024 | 62   | 210       |       | MOV              | T,A          |
| 0025 | 45   | 211       |       | STRT             | CNT          |
|      |      | 212       | TWAIT:|                  |              |
| 0026 | 162A | 213       |       | JTF              | WLOOP        |
| 0028 | 0426 | 214       |       | JMP              | TWAIT        |
|      |      | 215       | WLOOP:|                  |              |
| 002A | EB24 | 216       |       | DJNZ             | R3,WAIT      | ;NOT DONE
| 002C | EA24 | 217       |       | DJNZ             | R2,WAIT      | ;STILL NOT DONE
| 002E | 65   | 218       |       | STOP             | TCNT         | ;DONE, FINALLY
|      |      | 219       | PHASE:|                  |              |
|      |      | 220       |       | EDGE             | 0AH          | ;FIND VOLTAGE EDGE
| 002F | D5   | 221+      |       | SEL              | RB1          |
| 0030 | 0A   | 222+      |       | IN               | A,P2         | ;GET INITIAL CONDITION
| 0031 | AB   | 223+      |       | MOV              | R3,A         | ;SAVE IT
|      |      | 224+??0001:|      |                  |              |
| 0032 | BA0A | 225+      |       | MOV              | R2,#0AH      |
|      |      | 226+??0002:|      |                  |              | ;READ VOLTAGE.
| 0034 | 0A   | 227+      |       | IN               | A,P2         | ;XRL WITH ORIGINAL CONDITION
| 0035 | DB   | 228+      |       | XRL              | A,R3         | ;INVERT RESULT
| 0036 | 37   | 229+      |       | CPL              | A            | ;SAME
| 0037 | 9232 | 230+      |       | JB4              | ??0001       | ;DEBOUNCE IT
| 0039 | EA34 | 231+      |       | DJNZ             | R2,??0002    |
| 003B | C5   | 232+      |       | SEL              | RB0          | ;CLEAR PHASE ANGLE COUNT
| 003C | 27   | 233       |       | CLR              | A            |
| 003D | 62   | 234       |       | MOV              | T,A          | ;START COUNTER
| 003E | 45   | 235       |       | STRT.            | CNT          | ;TRIAC OFF
| 003F | 9AF7 | 236       |       | ANL              | P2,#TROFF    | ;CHECK RUN/CALIB
| 0041 | B650 | 237       |       | JF0              | NOCAL        | ;CHECK UP/DOWN
| 0043 | 0A   | 238       |       | IN               | A,P2         | ;CALIB ONLY ON POSITIV HALF CYCLE
| 0044 | 9248 | 239       |       | JB4              | UPDLY        |
| 0046 | 0450 | 240       |       | JMP              | NOCAL        |
|      |      | 241       | UPDLY:|                  |              | ;INC ONLY EVERY OTHER CYCLE
| 0048 | FA   | 242       |       | MOV              | A,R2         |
| 0049 | D301 | 243       |       | XRL              | A,#FLOP      |
| 004B | AA   | 244       |       | MOV              | R2,A         |
| 004C | 3250 | 245       |       | JB1              | NOCAL        |
| 004E | 1C   | 246       |       | INC              | R4           |
| 004F | 1F   | 247       |       | INC              | R7           |
|      |      | 248       | NOCAL:|                  |              | ;SET UP LOOP COUNT 4MS
| 0050 | B9B9 | 249       |       | MOV              | R1,#MAXWT    |
|      |      | 250       | WAITC:|                  |              | ;INSURE INPUT PORTS LATCHED HIGH
| 0052 | 8A30 | 251       |       | ORL              | P2,#P2IN     | ;CHECK FOR ZERO CROSS OF CURRENT
| 0054 | 0A   | 252       |       | IN               | A,P2         |
| 0055 | 37   | 253       |       | CPL              | A            |
| 0056 | B25E | 254       |       | JB5              | CUROX        | ;GOT IT
| 0058 | E952 | 255       |       | DJNZ             | R1,WAITC     | ;NO, KEEP LOOKING
| 005A | B801 | 256       |       | MOV              | R0,#MTROFF   | ;MOTOR IS OFF
| 005C | 0495 | 257       |       | JMP              | DEL0         | ;MAX WAIT FIRE IMMEDIATE
|      |      | 258       | CUROX:|                  |              |
| 005E | 65   | 259       |       | STOP             | TCNT         | ;STOP COUNTER
| 005F | F8   | 260       |       | MOV              | A,R0         | ;PICK UP MOTOR STATUS FLAG
| 0060 | 1209 | 261       |       | JB0              | INIT         | ;MOTOR IS NOW ON, RESTART COMPUTER
| 0062 | 42   | 262       |       | MOV              | A,T          | ;SAVE PHASE ANGLE COUNT
| 0063 | 0308 | 263       |       | ADD              | A,#08H       | ;DUMMY ADD TO ACCOUNT FOR DELAY IN DEBOUNCE AT 'EDGE'
| 0065 | AE   | 264       |       | MOV              | R6,A         |
| 0066 | D5   | 265       |       | SEL              | RB1          | ;SET UP TO SAVE INIT PHASE ANGLE
| 0067 | AD   | 266       |       | MOV              | R5,A         | ;SAVE CURRENT PHASE ANGLE
| 0068 | F8   | 267       |       | MOV              | A,R0         | ;IS SAVED PHASE ANGLE ZERO
| 0069 | 9689 | 268       |       | JNZ              | NOFST        | ;NO A VALUE ALLREADY EXISTS
| 006B | F9   | 269       |       | MOV              | A,R1         | ;LOAD LOOP CONTROL
| 006C | 927D | 270       |       | JB4              | AVG          | ;IF SIXTEEN COUNTS THEN COMPUTE AVERAGE
| 006E | 17   | 271       |       | INC              | A            | ;NOT YET, BUMP COUNTER
| 006F | A9   | 272       |       | MOV              | R1,A         | ;SAVE COUNTER
| 0070 | FE   | 273       |       | MOV              | A,R6         | ;LOAD LSB OF DBL WORD COUNTER
| 0071 | 97   | 274       |       | CLR              | C            | ;CLEAR CARRY
| 0072 | 6D   | 275       |       | ADD              | A,R5         | ;ADD LATEST PHASE ANGLE
| 0073 | AE   | 276       |       | MOV              | R6,A         | ;SAVE RESULT
| 0074 | FF   | 277       |       | MOV              | A,R7         | ;LOAD MSB OF DBL WORD COUNTER
| 0075 | 1300 | 278       |       | ADDC             | A,#0         | ;ADD CARRY
| 0077 | AF   | 279       |       | MOV              | R7,A         | ;SAVE RESULT
| 0078 | FD   | 280       |       | MOV              | A,R5         | ;PICK UP CURRENT PHASE ANGLE
| 0079 | C5   | 281       |       | SEL              | RB0          | ;BACK TO ORIGINAL PHASE ANGL
| 007A | AF   | 282       |       | MOV              | R7,A         | ;CONTROLL TO THIS CURRENT ONE
| 007B | 048A | 283       |       | JMP              | BYP1         |
| 007D | FE   | 284       | AVG:  | MOV              | A,R6         | ;LOAD LSB OF DBL WORD COUNTER

ISIS-II MCS-48/UPI-41 MACRO ASSEMBLER, V3.0
MCS 48 DIGITAL MOTOR CONTROLLER, V.M=9.0

```
LOC  OBJ      LINE          SOURCE STATEMENT 007E 53F0     285           ANL     A,#0FOH         ;MASK OFF RIGHTMOST NIBBLE
0080 4F       286           ORL     A,R7            ;PUT IGTMST NIBBLE OF MSB OF COUNTER
                                                     INTO A
0081 47       287           SWAP    A               ;NOW PUT EVERYBODY STRAIGHT
0082 A8       288           MOV     R0,A            ;SAVE AVERAGE PHASE ANGLE OVER 16
                                                     CAPTURES
0083 85       289           CLR     F0              ;NOW ALLOW CALIBRATE TO 3DB POINT
0084 C5       290           SEL     RB0
0085 BF00     291           MOV     R7,#0           ;NOW ZERO CONTROLL PHASE ANGLE
0087 048A     292           JMP     BYP1
0089 C5       293 NOFST:    SEL     RB0
008A FC       294 BYP1:     MOV     A,R4            ;LOAD DELAY COUNT
008B C695     295           JZ      DEL0
008D 37       296           CPL     A
008E 17       297           INC     A
008F 62       298           MOV     T,A
0090 45       299           STRT    CNT             ;START COUNTER
              300 DELAY:
0091 1695     301           JTF     DEL0            ;WAIT FOR DELAY TO EXPIRE
0093 0491     302           JMP     DELAY
              303 DEL0:
0095 8A08     304           ORL     P2,#TRON        ;TRIAC ON
0097 65       305           STOP    TCNT            ;STPP COUNTER
0098 FC       306           MOV     A,R4            ;DISPLAY % SAVED
0099 37       307           CPL     A
009A 8A07     308           ORL     P2,#SVOFF       ;TURNSAVE LIGHTS OFF
009C 92A0     309           JB4     SV20L
009E 9AFE     310           ANL     P2,#SV10        ;10%
              311 SV20L:
00A0 B2A4     312           JB5     SV30L
00A2 9AFD     313           ANL     P2,#SV20        ;20%
              314 SV30L:
00A4 D2A8     315           JB6     SVDN
00A6 9AFB     316           ANL     P2,#SV30        ;30%
              317 SVDN:
00A8 0A       318           IN      A,P2            ;CHECK FOR POS HALF CYCLE
00A9 92AD     319           JB4     DISPA           ;YES
00AB 042F     320           JMP     PHASE           ;NO, DONT DISPLAY OR AUTO ADJUST
              321 DISPA:
00AD FE       322           MOV     A,R6            ;WRITE PHASE ANGLE
00AE 37       323           CPL     A
00AF 17       324           INC     A
00B0 6F       325           ADD     A,R7
00B1 B6B7     326           JF0     DLYAD           ;RUN   MODE
00B3 F6CC     327           JC      MFU             ;CALIBRATED AT LAST
00B5 042F     328           JMP     PHASE           ;KEEP TRYING
              329 DLYAD:
00B7 37       330           CPL     A
00B8 17       331           INC     A
00B9 C62F     332           JZ      PHASE           ;CHECK UP OR DOWN CORRECTION
00BB F6C2     333           JC      DECDL           ;NIETHER
00BD 97       334           CLR     C               ;DOWN
00BE 6C       335           ADD     A,R4
00BF AC       336           MOV     R4,A
00C0 042F     337           JMP     PHASE           ;DONE
              338 DECDL:
00C2 97       339           CLR     C               ;CALC ADJ
00C3 A7       340           CPL     C
00C4 6C       341           ADD     A,R4
00C5 AC       342           MOV     R4,A
00C6 F62F     343           JC      PHASE           ;RESULT POSITIVE, OK
00C8 27       344           CLR     A               ;RESULT NEGATIVE, MAKE 0
00C9 AC       345           MOV     R4,A
00CA 042F     346           JMP     PHASE           ;DO IT AGAIN
              347 MFU:
00CC 95       348           CPL     F0              ;SET TO RUN MODE
              349 $INCLUDE(:F1:PFALG1.S01)
            = 350 ;
            = 351 ;         POWER FACTOR CONTROLL ALGORITHM
            = 352 ;
            = 353 ;         ON ENTRY:      RB0:R7=FINAL DELAY
            = 354 ;                        RB1:R0=INITIAL PHASE ANGLE
            = 355 ;         CALCULATED:    Q=INITIAL PHASE ANGLE
            = 356 ;                        D=FINAL DELAY
            = 357 ;
            = 358 ;                   1.   A=Q-D
            = 359 ;                   2.   A=A*100
            = 360 ;                   3.   N=A/Q
            = 361 ;                   4.   N=N*100
            = 362 ;                   5.   N=N/QFACT
            = 363 ;                   6.   D=D*N
            = 364 ;                   7.   D=D/100
            = 365 ;
            = 366 ;         ON EXIT:       RB0:R7=NEW ADJUSTED OPTIMUM PHASE ANGLE
            = 367 ;
```

ISIS-II MCS-48/UPI-41 MACRO ASSEMBLER, V3.0
MCS 48 DIGITAL MOTOR CONTROLLER, V.M=9.0

```
  LOC  OBJ         LINE         SOURCE STATEMENT

00CD FF        = 368          MOV      A,R7          ;SAVE FINAL DELAY
  00CE D5        = 369          SEL      RB1
  00CF AF        = 370          MOV      R7,A          ;PUT FINAL DELAY INTO RB1:R7
  00D0 F8        = 371          MOV      A,R0          ;GET INITIAL PHASE ANGLE
  00D1 AE        = 372          MOV      R6,A          ;INTO RB1:R6
                 = 373 ;
                 = 374 ;   1.   A=Q-D
                 = 375 ;
  00D2 FF        = 376          MOV      A,R7
  00D3 37        = 377          CPL      A
  00D4 17        = 378          INC      A
  00D5 A8        = 379          MOV      R0,A
  00D6 FE        = 380          MOV      A,R6
  00D7 68        = 381          ADD      A,R0
  00D8 AA        = 382          MOV      R2,A
  00D9 B964      = 383          MOV      R1,#100
                 = 384 ;
                 = 385 ;   2.   A=A*100
                 = 386 ;
                 = 387          MULT
                 = 388+;
                 = 389+;        MULTIPLIER     =R1
                 = 390+;        MULTLIPLICAND  =R2
                 = 391+;        LOOPER         =R3
  00DB BB08      = 392+??0003:  MOV      R3,#08H       ;COUNTER TO 0
  00DD 27        = 393+         CLR      A
  00DE 97        = 394+         CLR      C
  00DF 67        = 395+??0004:  RRC      A
  00E0 29        = 396+         XCH      A,R1
  00E1 67        = 397+         RRC      A
  00E2 29        = 398+         XCH      A,R1
  00E3 E6E6      = 399+         JNC      ??0005
  00E5 6A        = 400+         ADD      A,R2
  00E6 EBDF      = 401+??0005:  DJNZ     R3,??0004
  00E8 67        = 402+         RRC      A
  00E9 29        = 403+         XCH      A,R1
  00EA 67        = 404+         RRC      A
  00EB 29        = 405+         XCH      A,R1
  00EC AA        = 406          MOV      R2,A
  00ED F9        = 407          MOV      A,R1
  00EE AB        = 408          MOV      R3,A
  00EF FE        = 409          MOV      A,R6
                 = 410 ;
                 = 411 ;   3.   N=A/Q
                 = 412 ;
  00F0 2400      = 413          JMP      PAGE1         ;JUMP AROUND THIS Q/D PROBLEM
  0100           = 414          ORG      100H
                 = 415 PAGE1:
                 = 416          DIVID
                 = 417+;        DIVIDEND   =R2,R3
                 = 418+;        DIVISOR    =A
                 = 419+;        QUOTIENT   =R3,R4
                 = 420+;        REMAINDER  =R2
                 = 421+
  0100 BD09      = 422+??0006:  MOV      R5,#9         ;INIT COUNTER
  0102 A8        = 423+         MOV      R0,A          ;R0=DIVISOR
  0103 97        = 424+??0007:  CLR      C             ;DIVISOR NORMALIZ
  0104 F211      = 425+         JB7      ??0008        ;IF BIT7 = 0
  0106 37        = 426+         CPL      A             ;OR
  0107 6A        = 427+         ADD      A,R2          ;IF R2 > DIVISOR
  0108 E611      = 428+         JNC      ??0008
  010A 37        = 429+         CPL      A
  010B 1D        = 430+         INC      R5
  010C F8        = 431+         MOV      A,R0
  010D E7        = 432+         RL       A
  010E A8        = 433+         MOV      R0,A
  010F 2403      = 434+         JMP      ??0007
  0111 BC00      = 435+??0008:  MOV      R4,#0
  0113 FA        = 436+         MOV      A,R2
  0114 37        = 437+??0009:  CPL      A
  0115 F61C      = 438+         JC       ??0010
  0117 68        = 439+         ADD      A,R0
  0118 F620      = 440+         JC       ??0012
  011A 241E      = 441+         JMP      ??0011
  011C 68        = 442+??0010:  ADD      A,R0
  011D 97        = 443+         CLR      C
  011E 37        = 444+??0011:  CPL      A
  011F AA        = 445+         MOV      R2,A
  0120 A7        = 446+??0012:  CPL      C
  0121 FC        = 447+         MOV      A,R4
  0122 F7        = 448+         RLC      A
  0123 AC        = 449+         MOV      R4,A
  0124 FB        = 450+         MOV      A,R3
  0125 F7        = 451+         RLC      A
  0126 AB        = 452+         MOV      R3,A
```

ISIS-II MCS-48/UPI-41 MACRO ASSEMBLER, V3.0
MCS 48 DIGITAL MOTOR CONTROLLER, V.M=9.0

```
LOC  OBJ        LINE         SOURCE STATEMENT

0127 FA        = 453+        MOV       A,R2
0128 F7        = 454+        RLC       A
0129 AA        = 455+        MOV       R2,A
012A ED14      = 456+        DJNZ      R5,??0009
012C 67        = 457+        RRC       A
012D AA        = 458+        MOV       R2,A
012E FC        = 459         MOV       A,R4
012F AA        = 460         MOV       R2,A
0130 8964      = 461         MOV       R1,#100
               = 462 ;
               = 463 ;       4.        N=N*100
               = 464 ;
               = 465         MULT
               = 466+;
               = 467+;       MULTIPLIER           =R1
               = 468+;       MULTLIPLICAND        =R2
               = 469+;       LOOPER               =R3
0132 BB08      = 470+??0013: MOV       R3,#08H                    ;COUNTER TO 0
0134 27        = 471+        CLR       A
0135 97        = 472+        CLR       C
0136 67        = 473+??0014: RRC       A
0137 29        = 474+        XCH       A,R1
0138 67        = 475+        RRC       A
0139 29        = 476+        XCH       A,R1
013A E63D      = 477+        JNC       ??0015
013C 6A        = 478+        ADD       A,R2
013D EB36      = 479+??0015: DJNZ      R3,??0014
013F 67        = 480+        RRC       A
0140 29        = 481+        XCH       A,R1
0141 67        = 482+        RRC       A
0142 29        = 483+        XCH       A,R1
0143 AA        = 484         MOV       R2,A
0144 F9        = 485         MOV       A,R1
0145 AB        = 486         MOV       R3,A
0146 2323      = 487         MOV       A,#QFACT
               = 488 ;
               = 489 ;       5.        N=N/QFACT
               = 490 ;
               = 491         DIVID
               = 492+;       DIVIDEND             =R2,R3
               = 493+;       DIVISOR              =A
               = 494+;       QUOTIENT             =R3,R4
               = 495+;       REMAINDER            =R2
               = 496+
0148 BD09      = 497+??0016: MOV       R5,#9                      ;INIT COUNTER
014A A8        = 498+        MOV       R0,A                       ;R0=DIVISOR
014B 97        = 499+??0017: CLR       C                          ;DIVISOR NORMALIZ
014C F259      = 500+        JB7       ??0018                     ;IF BIT7 = 0
014E 37        = 501+        CPL       A                          ;OR
014F 6A        = 502+        ADD       A,R2                       ;IF R2 > DIVISOR
0150 E659      = 503+        JNC       ??0018
0152 37        = 504+        CPL       A
0153 1D        = 505+        INC       R5
0154 F8        = 506+        MOV       A,R0
0155 E7        = 507+        RL        A
0156 A8        = 508+        MOV       R0,A
0157 244B      = 509+        JMP       ??0017
0159 BC00      = 510+??0018: MOV       R4,#0
015B FA        = 511+        MOV       A,R2
015C 37        = 512+??0019: CPL       A
015D F664      = 513+        JC        ??0020
015F 68        = 514+        ADD       A,R0
0160 F668      = 515+        JC        ??0022
0162 2466      = 516+        JMP       ??0021
0164 68        = 517+??0020: ADD       A,R0
0165 97        = 518+        CLR       C
0166 37        = 519+??0021: CPL       A
0167 AA        = 520+        MOV       R2,A
0168 A7        = 521+??0022: CPL       C
0169 FC        = 522+        MOV       A,R4
016A F7        = 523+        RLC       A
016B AC        = 524+        MOV       R4,A
016C FB        = 525+        MOV       A,R3
016D F7        = 526+        RLC       A
016E AB        = 527+        MOV       R3,A
016F FA        = 528+        MOV       A,R2
0170 F7        = 529+        RLC       A
0171 AA        = 530+        MOV       R2,A
0172 ED5C      = 531+        DJNZ      R5,??0019
0174 67        = 532+        RRC       A
0175 AA        = 533+        MOV       R2,A
0176 FC        = 534         MOV       A,R4
0177 AA        = 535         MOV       R2,A
0178 FF        = 536         MOV       A,R7
0179 A9        = 537         MOV       R1,A
               = 538 ;
```

ISIS-II MCS-48/UPI-41 MACRO ASSEMBLER, V3.0
MCS 48 DIGITAL MOTOR CONTROLLER, V.M=9.0

```
LOC   OBJ         LINE         SOURCE STATEMENT

= 539 ;        6.      D=D*N
                = 540 ;
                = 541          MULT
                = 542+;
                = 543+;                MULTIPLIER      =R1
                = 544+;                MULTLIPLICAND   =R2
                = 545+;                LOOPER          =R3
017A BB08       = 546+??0023:  MOV     R3,#08H                 ;COUNTER TO 0
017C 27         = 547+         CLR     A
017D 97         = 548+         CLR     C
017E 67         = 549+??0024:  RRC     A
017F 29         = 550+         XCH     A,R1
0180 67         = 551+         RRC     A
0181 29         = 552+         XCH     A,R1
0182 E685       = 553+         JNC     ??0025
0184 6A         = 554+         ADD     A,R2
0185 EB7E       = 555+??0025:  DJNZ    R3,??0024
0187 67         = 556+         RRC     A
0188 29         = 557+         XCH     A,R1
0189 67         = 558+         RRC     A
018A 29         = 559+         XCH     A,R1
018B AA         = 560          MOV     R2,A
018C F9         = 561          MOV     A,R1
018D AB         = 562          MOV     R3,A
018E 2364       = 563          MOV     A,#100
                = 564 ;
                = 565 ;        7.      D=D/100
                = 566 ;
                = 567          DIVID
                = 568+;                DIVIDEND        =R2,R3
                = 569+;                DIVISOR         =A
                = 570+;                QUOTIENT        =R3,R4
                = 571+;                REMAINDER       =R2
                = 572+
0190 BD09       = 573+??0026:  MOV     R5,#9                   ;INIT COUNTER
0192 A8         = 574+         MOV     R0,A                    ;R0=DIVISOR
0193 97         = 575+??0027:  CLR     C                       ;DIVISOR NORMALIZ
0194 F2A1       = 576+         JB7     ??0028                  ;IF BIT7 = 0
0196 37         = 577+         CPL     A                       ;OR
0197 6A         = 578+         ADD     A,R2                    ;IF R2 > DIVISOR
0198 E6A1       = 579+         JNC     ??0028
019A 37         = 580+         CPL     A
019B 1D         = 581+         INC     R5
019C F8         = 582+         MOV     A,R0
019D E7         = 583+         RL      A
019E A8         = 584+         MOV     R0,A
019F 2493       = 585+         JMP     ??0027
01A1 BC00       = 586+??0028:  MOV     R4,#0
01A3 FA         = 587+         MOV     A,R2
01A4 37         = 588+??0029:  CPL     A
01A5 F6AC       = 589+         JC      ??0030
01A7 68         = 590+         ADD     A,R0
01A8 F6B0       = 591+         JC      ??0032
01AA 24AE       = 592+         JMP     ??0031
01AC 68         = 593+??0030:  ADD     A,R0
01AD 97         = 594+         CLR     C
01AE 37         = 595+??0031:  CPL     A
01AF AA         = 596+         MOV     R2,A
01B0 A7         = 597+??0032:  CPL     C
01B1 FC         = 598+         MOV     A,R4
01B2 F7         = 599+         RLC     A
01B3 AC         = 600+         MOV     R4,A
01B4 FB         = 601+         MOV     A,R3
01B5 F7         = 602+         RLC     A
01B6 AB         = 603+         MOV     R3,A
01B7 FA         = 604+         MOV     A,R2
01B8 F7         = 605+         RLC     A
01B9 AA         = 606+         MOV     R2,A
01BA EDA4       = 607+         DJNZ    R5,??0029
01BC 67         = 608+         RRC     A
01BD AA         = 609+         MOV     R2,A
01BE FC         = 610          MOV     A,R4            ;GET RESULE
01BF C5         = 611          SEL     RB0                     ;INTO RB0:R7
01C0 AF         = 612          MOV     R7,A                    ;DONE
01C1 042F         613          JMP     PHASE
                  614          END
```

```
USER SYMBOLS
AVG     007D    BYP1    008A    CUROX   005E    DECDL   00C2    DEL0    0095    DELAY   0091    DISPA   00AD    DIVID   0000
DLYAD   00B7    EDGE    0007    FIVE    0005    FLOP    0001    INIT    0009    IP2     00FF    MAXWT * 00B9    MFU     00CC
MTROFF  0001    MTRON   0000    MULT    0005    NOCAL   0030    NOFST   0089    P2IN,   0030    PAGE1   0100    PHASE   002F
QFACT   0023    SV10    00FE    SV20    00FD    SV20L   00A0    SV30    00FB    SV30L   00A4    SVDN    00A8    SVOFF   0007
TROFF   00F7    TRON    0008    TWAIT   0026    UPDLY   0048    WAIT    0024    WAITC   0052    WLOOP   002A    ZERO    0000
```

ASSEMBLY COMPLETE, NO ERRORS

What we claim is:

1. A digital induction motor control system for controlling an induction motor based on a calibrated phase angle comprising:
   (a) a clock for producing a train of pulses;
   (b) a phase angle counter connected to said clock for counting said pulses to produce a digital number corresponding to the actual phase angle between motor supply voltage and motor current zero crossings;
   (c) variable delay counter means connected to said clock for delaying energization of said motor by counting said pulses, beginning with a first digital number, to produce a firing command when said count has reached a second digital number, said delay occurring following said motor current zero crossing;
   (d) phase angle storage means for storing a digital number corresponding to a calibrated phase angle;
   (e) digital comparator means connected to said phase angle counter and to said storage means for comparing the actual phase angle in said phase angle counter with the calibrated phase angle in said storage means and for altering at least one of the two numbers in said delay counter means in response to said comparison so as to vary the delay in energizing said motor to maintain the actual phase angle in a predetermined relationship to the calibrated phase angle irrespective of variations in motor load; and
   (f) a switchable device adapted to be electrically connected in series with a winding of said induction motor and to said delay counter means for energizing said induction motor in response to said firing command from said delay counter means.

2. Apparatus for automatically deriving a calibrated phase angle for a digital induction motor control system comprising:
   (a) a clock for producing a train of pulses;
   (b) a phase angle counter connected to said clock for counting said pulses to produce a digital number corresponding to the actual phase angle between motor supply voltage and motor current zero crossings;
   (c) variable delay counter means connected to said clock for delaying energization of said motor by counting said pulses, beginning with a first digital number, to produce a firing command when said count has reached a second digital number, said delay occurring following said motor current zero crossing;
   (d) digital comparator means connected to said phase angle counter and to said delay counter means for comparing the actual phase angle in said phase angle counter with the difference between the two numbers in said delay counter means and for automatically altering at least one of said two numbers in response to said comparison so as to vary the delay in energizing said motor until the number in said phase angle counter and the difference between the two numbers in said delay counter means differ by a predetermined amount to thereby derive a calibrated phase angle; and
   (e) a switchable device adapted to be electrically connected in series with a winding of said induction motor and to said delay counter means for energizing said motor in response to said firing command from said delay counter means.

3. A self-calibrating digital induction motor control system comprising:
   (a) a clock for producing a train of pulses;
   (b) a phase angle counter connected to said clock for counting said pulses to produce a digital number corresponding to the actual phase angle between motor supply voltage and motor current zero crossings;
   (c) variable delay counter means connected to said clock for delaying energization of said motor by counting said pulses, beginning with a first digital number, to produce a firing command when said count has reached a second digital number, said delay occurring following said motor current zero crossing;
   (d) phase angle storage means connected to said phase angle counter for storing a digital number corresponding to a calibrated phase angle;
   (e) digital comparator means connected to said phase angle counter and:
      (i) during start-up being connected to said delay counter means for comparing the actual phase angle in said phase angle counter with the difference between the two numbers in said delay counter means and for automatically altering at least one of said two numbers so as to vary the delay in energizing said motor until the number in said phase angle counter and the difference between the two numbers in said delay counter means differ by a predetermined amount to thereby derive said calibrated phase angle;
      (ii) during run being connected to said phase angle storage means for comparing the actual phase angle in said phase angle counter with the calibrated phase angle in said phase angle storage means and for altering at least one of the two numbers in said delay counter means so as to vary the delay in energizing said motor to maintain said actual phase angle in a predetermined relationship to said calibrated phase angle irrespective of variations in motor load; and
   (f) a switchable device adapted to be electrically connected in series with a winding of said induction motor and to said delay counter means for energizing said induction motor in response to said firing command from said delay counter means.

4. A digital motor controller according to claims 1, 2 or 3 wherein said phase angle counter counts up and said delay counter means counts down.

5. A digital motor controller according to claims 1, 2 or 3 wherein said phase angle counter starts counting each time said motor voltage crosses zero.

6. A digital power factor controller according to claim 7 wherein said phase angle counter stops counting and said delay counter means starts counting each time said motor current crosses zero.

7. A digital power factor controller according to claim 1 wherein at least one of said first and second numbers is altered twice each cycle.

8. A digital power factor controller according to claims 1 or 7 wherein the difference between said first and second numbers is altered by an amount proportional to the difference between the number in said phase angle counter and the number in said storage means.

9. A digital power factor controller according to claims 1 or 7 wherein the difference between said first and second numbers is altered by an amount equal to the difference between the number in said phase angle counter and the number in said storage means.

10. A digital power factor controller according to claim 2 wherein at least one of said first and second numbers is altered once every other cycle.

11. A digital motor controller according to claims 2 or 10 wherein the difference between said first and second numbers is altered in uniform increments.

12. A digital motor controller according to claims 1 or 3 wherein said phase angle storage means comprises a register.

13. A digital motor controller according to claims 1, 2 or 3 wherein said comparator means comprises an arithmetic logic unit.

14. A self-calibrating digital power factor controller according to claim 3 wherein said number in said phase angle counter is transferred to said phase angle storage means during start-up when said number in said phase angle counter approximately equals the difference between said first and second numbers.

15. A self-calibrating digital power factor controller according to claim 14 wherein said controller switches from start-up to run when said number in said phase angle counter approximately equals the difference between said first and second numbers.

16. A self-calibrating digital power factor controller according to claim 3 wherein said comparator means comprises:
means for storing a number corresponding to an initial phase angle $\theta_1$;
means for storing a number corresponding to a phase angle $\theta_2$ when the count in said phase angle counter approximately equals the difference between said predetermined numbers;
means for determining a number $N_1 = /\theta_1$;
means for determining a number $N_2 = KN_1$, where K is a constant; and
means for determining a calibrated phase angle $\theta_3 = N_2\theta_2$.

17. A self-calibrating digital power factor controller according to claim 16 wherein K is approximately 1/0.46.

18. A self-calibrating digital power factor controller according to claims 1, 2, 3 or 16 wherein said comparator means comprises a programmed digital computer.

19. A method for operating a digital induction motor control system based on a calibrated phase angle comprising the steps of:
(a) generating a train of clock pulses;
(b) counting said clock pulses to produce a digital number corresponding to the actual phase angle between motor supply voltage and motor current zero crossings;
(c) counting said clock pulses to delay energization of said motor, beginning with a first digital number, to produce a firing command when the count has reached a second digital number, said delay occurring following said motor current zero crossing;
(d) digitally comparing said number corresponding to said actual phase angle with a number corresponding to a calibrated phase angle;
(e) altering at least one of said first and second numbers in response to said comparison so as to vary the delay in energizing said motor to maintain said actual phase angle in a predetermined relationship to said calibrated phase angle irrespective of variations in motor load; and
(f) energizing said motor in response to said firing command following said delay.

20. A method for automatically deriving a calibrated phase angle for a digital induction motor control system comprising the steps of:
(a) generating a train of clock pulses;
(b) counting said clock pulses to produce a digital number corresponding to the actual phase angle between motor supply voltage and motor current zero crossings;
(c) counting said clock pulses to delay energization of such motor, beginning with a first digital number, to produce a firing command when the count has reached a second digital number, said delay occurring following said motor current zero crossing;
(d) digitally comparing said number corresponding to the actual phase angle with the difference between said first and second numbers;
(e) automatically altering at least one of said first and second numbers in response to said comparison so as to vary the delay in energizing said motor until said number corresponding to said actual phase angle and the difference between said first and second numbers differ by a predetermined amount to thereby derive a calibrated phase angle; and
(f) energizing said motor in response to said firing command following said delay.

21. A method for operating a self-calibrating digital induction motor control system comprising the steps of:
(a) generating a train of clock pulses;
(b) counting said clock pulses to produce a digital number corresponding to the actual phase angle between motor supply voltage and motor current zero crossings;
(c) counting said clock pulses to delay energization of such motor, beginning with a first digital number, to produce a firing command when the count has reached a second digital number, said delay occurring following said motor current zero crossing;
(d) digitally comparing said number corresponding to said actual phase angle with the difference between said first and second numbers;
(e) automatically altering at least one of said first and second numbers in response to said comparison to vary the delay in energizing said motor until said number corresponding to said actual phase angle and the difference between said two numbers are approximately equal;
(f) storing one of said approximately equal digital numbers as the calibrated phase angle;
(g) digitally comparing said number corresponding to said actual phase angle with said number corresponding to said calibrated phase angle;
(h) altering at least one of said first and second numbers in response to said comparison so as to vary the delay in energizing said motor to maintain said number corresponding to said actual phase angle in a predetermined relationship to said number corresponding to said calibrated phase angle irrespective of variations in motor load; and
(i) energizing said motor in response to said firing command following said delay.

22. A method for operating a self-calibrating digital induction motor control system comprising the steps of:
(a) generating a train of clock pulses;

(b) counting said clock pulses to produce a digital number corresponding to the actual phase angle between motor supply voltage and motor current zero crossings;

(c) storing a digital number corresponding to an initial actual phase angle as $\theta_1$;

(d) counting said clock pulses to delay energization of said motor, beginning with a first digital number, to produce a firing command when the count has reached a second digital number, said delay occurring following said motor current zero crossing;

(e) digitally comparing said number corresponding to said actual phase angle with the difference between said first and second numbers;

(f) automatically altering at least one of said first and second numbers in response to said comparison to vary the delay in energizing said motor until said number corresponding to said actual phase angle and the difference between said first and second numbers are approximately equal;

(g) storing one of said approximately equal digital numbers as $\theta_2$;

(h) determining $N_1 = /\theta_1$;

(i) determining $N_2 = K\, N_1$, where K is a constant;

(j) determining $\theta_3 = N_2 \theta_2$;

(k) storing $\theta_3$ as the calibrated phase angle;

(l) digitally comparing said number corresponding to said actual phase angle with said calibrated phase angle;

(m) altering at least one of said first and second numbers in response to said comparison so as to vary the delay in energizing said motor to maintain said actual phase angle in a predetermined relationship to said calibrated phase angle; and (n) energizing said motor in response to said firing command following said delay.

23. A digital method according to claims 19, 20, 21 or 22 wherein said clock pulses are counted up to produce said number corresponding to said actual phase angle and said clock pulses are counted down to produce said output signal.

24. A digital method according to claim 23 wherein counting of said clock pulses to produce said number corresponding to said actual phase angle commences each time said motor voltage crosses zero.

25. A digital method according to claim 24 wherein counting of said clock pulses to produce said number corresponding to said actual phase angle ceases and counting of said clock pulses to produce said output signal commences each time said motor current crosses zero.

26. A digital method according to claim 19 wherein at least one of said first and second numbers is altered twice each cycle.

27. A digital method according to claims 19 or 26 wherein the difference between said first and second numbers is altered by an amount proportional to the difference between said number corresponding to said actual phase angle and said number corresponding to said desired phase angle.

28. A digital method according to claims 19 or 26 wherein the difference between said first and second numbers is altered by an amount equal to the difference between said number corresponding to said actual phase angle and said number corresponding to said desired phase angle.

29. A digital method according to claim 20 wherein at least one of said first and second numbers is altered once every other cycle.

30. A digital method according to claims 20 or 29 wherein the difference between said first and second numbers is altered in uniform increments.

31. A digital method according to claim 22 wherein K is approximately 1/0.46.

32. A system according to claims 1 or 3 wherein said predetermined relationship is one of approximate equality.

33. A method according to claims 25, 27 or 28 wherein said predetermined relationship is one of approximate equality.

* * * * *

UNITED STATES PATENT AND TRADEMARK OFFICE
CERTIFICATE OF CORRECTION

PATENT NO. : 4,361,792   Page 1 of 2

DATED : November 30, 1982

INVENTOR(S) : Ray E. Davis, Jr., Richard J. Becker, Robert G. Foster, Michael J. Westkamper, Earle J. Timothy & Richard H. Johnson It is certified that error appears in the above-identified patent and that said Letters Patent is hereby corrected as shown below:

Column 1, line 52: Change "ram" to --ramp--

Column 22, line 56: Change "power factor" to --motor-- line 57: Change "7" to --5-- line 60: Change "power factor" to --motor-- line 63: Change "power factor" to --motor--

Column 23, line 1: Change "power factor" to --motor-- line 6: Change "power factor" to --motor-- line 18: Delete "self-calibrating"

Change "power factor" to --motorline 24: Delete "self-calibrating"

Change "power factor" to --motor-- line 29: Delete "self-calibrating"

Change "power factor" to --motor-- line 38: Change "$N_1 = /\theta_1$" to --$N_1 = [\theta_1 - \theta_2]/\theta_1$--

UNITED STATES PATENT AND TRADEMARK OFFICE
CERTIFICATE OF CORRECTION

Page 2 of 2

PATENT NO. : 4,361,792

DATED : November 30, 1982

INVENTOR(S) : Ray E. Davis, Jr., Richard J. Becker, Robert G. Foster, Michael J. Westkamper, Earle J. Timothy, Richard H. Johnson It is certified that error appears in the above-identified patent and that said Letters Patent is hereby corrected as shown below:

Column 23, line 43: Delete "self-calibrating"

Change "power factor" to --motor-- line 46: Delete "self-calibrating"

Change "power factor" to --motor--

Column 25, line 23: Change "$N_1 =/\theta_1$" to --$N_1 = [\overline{\theta_1} - \overline{\theta_2}]/\theta_1$--

Signed and Sealed this

Tenth Day of May 1983

[SEAL]

Attest:

GERALD J. MOSSINGHOFF

Attesting Officer

Commissioner of Patents and Trademarks